United States Patent
Oppelt et al.

(10) Patent No.: US 6,828,913 B2
(45) Date of Patent: Dec. 7, 2004

(54) SCATTERED LIGHT SMOKE ALARM

(75) Inventors: Ulrich Oppelt, Zorneding (DE);
Andreas Hensel, Vaihingen (DE);
Bernd Siber, Glonn (DE); Anton Pfefferseder, Sauerlach-Arget (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 10/118,794

(22) Filed: Apr. 9, 2002

(65) Prior Publication Data

US 2002/0153499 A1 Oct. 24, 2002

(30) Foreign Application Priority Data

Apr. 19, 2001 (DE) .......................................... 101 18 913

(51) Int. Cl.[7] .................. G08B 17/10; G08B 13/18; G01N 15/06
(52) U.S. Cl. .................. 340/630; 340/628; 340/629; 340/577; 340/578; 340/579; 340/555; 340/556; 250/573; 250/574
(58) Field of Search ................ 340/628–630, 340/550, 552–557; 250/559.16, 573–574; 356/338, 342, 347

(56) References Cited

U.S. PATENT DOCUMENTS

| | | | | |
|---|---|---|---|---|
| 4,614,968 A | * | 9/1986 | Rattman et al. | 348/143 |
| 4,642,471 A | * | 2/1987 | Guttinger et al. | 250/574 |
| 5,008,559 A | * | 4/1991 | Beyersdorf | 250/575 |
| 5,381,130 A | | 1/1995 | Thuillard et al. | 340/630 |
| 5,451,931 A | * | 9/1995 | Muller et al. | 340/630 |
| 6,218,950 B1 | * | 4/2001 | Politze et al. | 340/630 |

FOREIGN PATENT DOCUMENTS

| | | | | |
|---|---|---|---|---|
| GB | 2 254 142 A | | 9/1992 | G08B/17/107 |
| GB | 2269665 A | * | 2/1994 | G08B/17/103 |
| WO | 01/80550 A2 | | 10/2001 | H04N/5/225 |

* cited by examiner

Primary Examiner—Jeffery Hofsass
Assistant Examiner—Lam Pham
(74) Attorney, Agent, or Firm—Michael J. Striker

(57) ABSTRACT

A dispersion light smoke detector has a structure for providing a definite measuring volume, the structure being formed as two light receivers or an imaging optical system for one light receiver.

6 Claims, 2 Drawing Sheets

SCATTERED LIGHT SMOKE ALARM

BACKGROUND OF THE INVENTION

The present invention relates to a scattered light smoke detector.

It is known to design optical smoke alarms as scattered light smoke alarms. The scattered light smoke alarm has either a measuring chamber in which the smoke penetrates through a labyrinth, or is formed as a free light scattered light smoke alarm, wherein a measuring volume is examined in a free space with respect to a reflection on smoke.

SUMMARY OF THE INVENTION

Accordingly, it is an object of the present invention to provide a scattered light smoke alarm which is a further improvement of the existing smoke alarms of this type.

In keeping with these objects and with others which will become apparent hereinafter, one feature of the present invention resides, briefly stated, in a scattered light smoke alarm which has means for providing a definite measuring volume, said means being formed as means selected from the group consisting of two light receivers, and an imaging optical system for one light receiver.

When the scattered light smoke alarm is designed in accordance with the present invention, it has the advantage in that an improved interference suppression is obtained, since a greater and first of all exactly defined air volume of the particles or smoke density is measured. No clouds, for example cigarette smoke have the smallest influence on the measuring results.

The definition of the measuring volume can be performed by a corresponding optical construction. For this purpose either two receivers are used or a transmitter and a receiver can be utilized each having an imaging optical system of lenses and apertures for definition of the measuring volume. Thereby the interference sensitivity of the inventive scattered light smoke alarm is minimized. The measuring volume is located in a region where in the event of a fire a high smoke density can be expected, and in the event when there is no fire there are low interferences. A typical region for this purpose is substantially 4–10 cm under a space sealing.

It is especially advantageous when the light receiver is composed of at least one detector row and a detector a nay. This advantageously provides for a possibility of measuring a speed and movement direction of an object. Also, this is an effective measure for distinguishing smoke and objects.

It is especially advantageous when each light receiver has two detector rows arranged perpendicular to one another, for two-dimensional tracking of a measuring object. It increases the interference safety and provides a simple design as a whole detector array.

A further advantageous embodiment of the inventive device for distinguishing between smoke and objects is the evaluation of contours of a measuring object. An object has sharp contours, while in contrast smoke has soft transition at the edges of a smoke cloud. By means of an image evaluation, thereby smoke or another object can be determined. This provides for a good possibility of the plausibilizing of the scattered light measuring results.

With the use of two light receivers which are offset relative to one another and include at least one detector row or a detector array, it is possible to determine a distance and a speed of the measuring object relative to the receivers. As a result, a spacial tracking of an object is possible.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
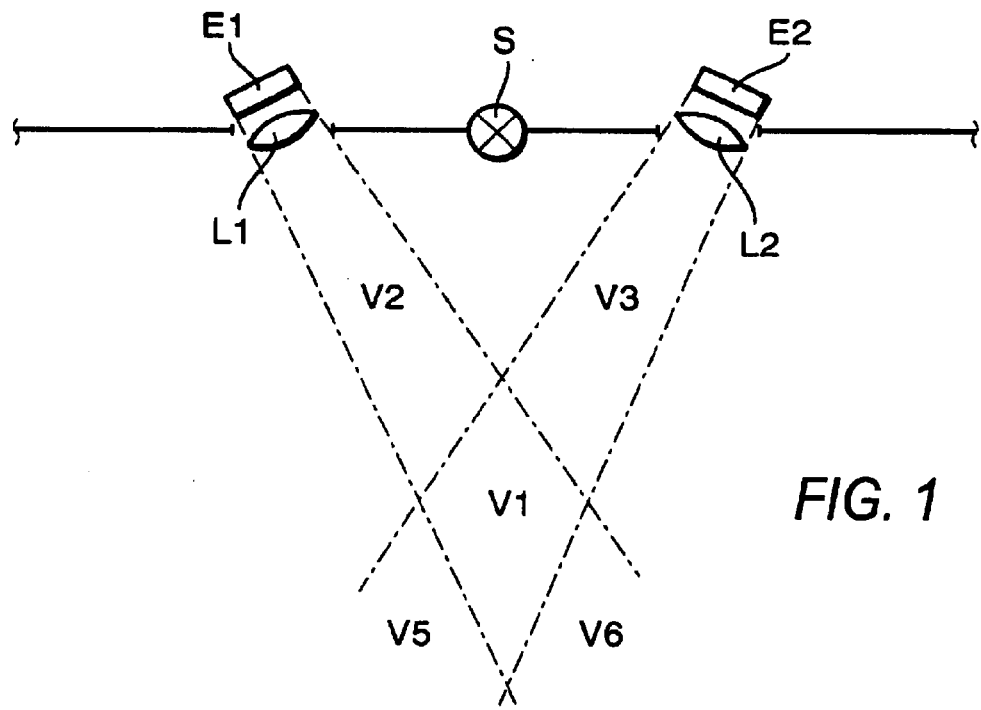
FIG. 1 is a view showing a scattered light smoke alarm in accordance with a first embodiment of the present invention for defining a measuring volume.

FIG. 1 shows a first embodiment of a scattered light smoke alarm in which a definition of a measuring value is provided with two light receivers. The scattered light smoke alarm here is a free space, scattered light smoke alarm, in which the measuring volume is available outside of the scattered light smoke alarm. Such a scattered light smoke alarm is arranged for example on a space sealing, so that the measuring volume is located several centimeters under the scattered light smoke alarm.

A light transmitter S is located centrally of the device. The light transmitter is formed for example by infrared light diodes or infrared laser diodes.

Light receivers E1 and E2 are arranged symmetrically to the light transmitter 5 and each have a lens L1 and L2 correspondingly as an imaging optical system. The light receivers, E2 are here infrared light detectors, for example CCD-detector arrays. Therefore, visible light has no substantial influence of the smoke detection. Through the lenses L1 and L2 a common measuring volume V1 observed by the light receivers E1 and E2 is defined, which the light transmitter 5 illuminates. The receiver E1 observes furthermore the measuring volumes V2, V6 while the light receiver E2 observes the measuring volumes V3 and V5.

By a correlation of the receiving signals of the light receivers E1 and E2 it is possible to determine whether smoke is located in the detection region. With the evaluation of the light receiver receiving signals it is determined whether smoke or an object is located in the volumes V1, V2, V3, V5 or V6.

Figure 2:
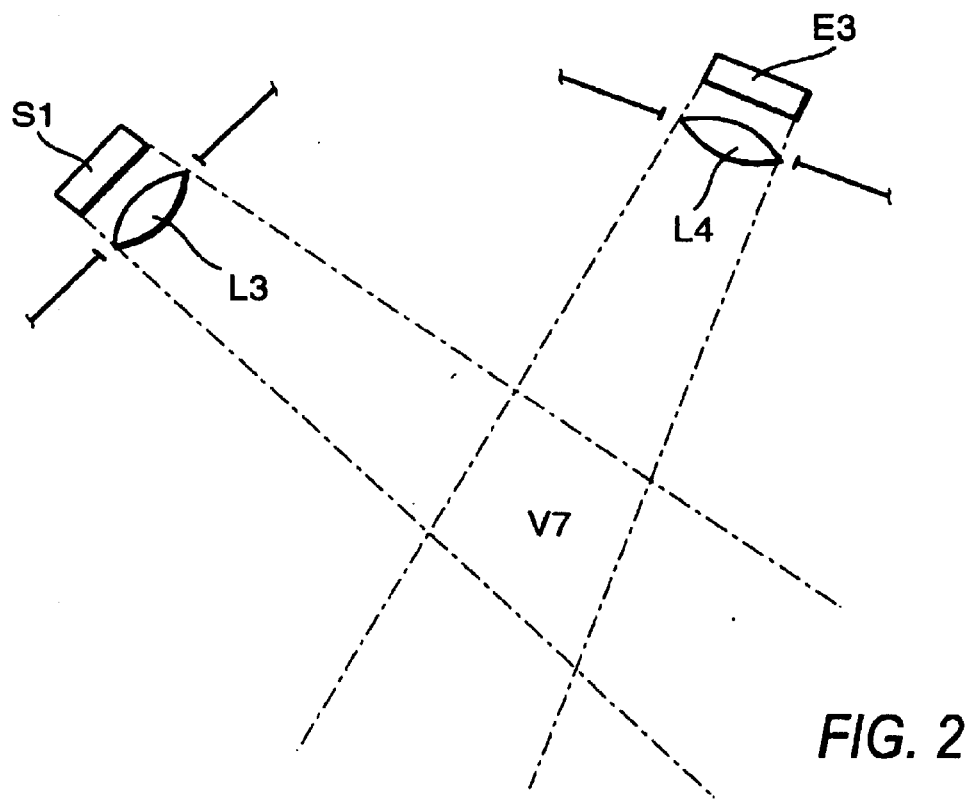
FIG. 2 is a view showing a scattered light smoke alarm in accordance with a second embodiment of the present invention for defining a measuring volume.

FIG. 2 shows a second embodiment for definition of a measuring volume. A transmitter S1 is located behind a lens L3, while the receiver E3 is located behind the lens L4. The light outlet cone of the light transmitter S1 and the receiving light cone of the receiver E3 intersect in the measuring volume V7. Here also with the use of infrared light only a strong receiving signal comes at the light receiver E3, when in the measuring volume A7 light of tile transmitter S1 is scattered on smoke or on an object in the light receiver E3 which is the general measuring principle of dispersion light smoke alarms.

Figure 3:
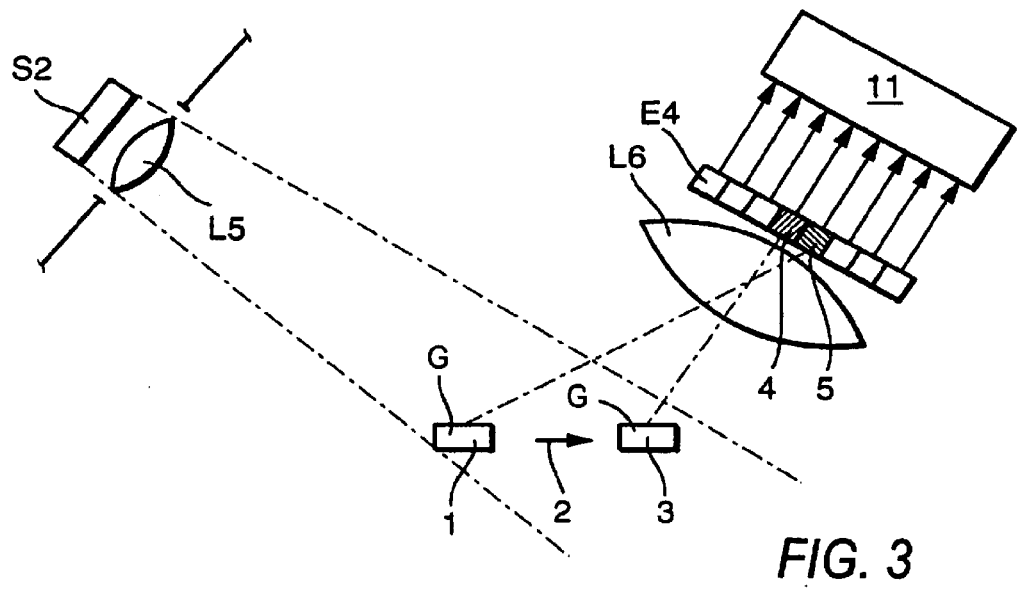
FIG. 3 is a view showing the use of a detector cell for tracking a movement of a measuring object in the inventive scattered light smoke alarm.

FIG. 3 shows how the movement direction of a measuring object is tracked by a light receiver. The light smoke alarm of FIG. 3 has a light transmitter S2 with a lens L5. In the light transmitting cone of the light transmitter S2, an object G is located at least in a position 1 and then is moved in direction 2 to a position 3. A light receiver E4 with a pre-arranged lens L6 is here formed as a detector row with individual detector elements. The position 1 of the object G leads to a radiation of the detector element 5. The position 3 of the object G leads to a radiation of the detector element 4.

With corresponding signal processing in a processor 11 Which is located after the detector elements, a tracking of the object G in dependence on the time is possible. Thereby, it is possible to determine the speed and the direction of the light dispersing or a reflecting object G in two dimensions, or in other words in a plane. This is possible especially when instead of a detector row, the detector rows formed as light receivers E4 or are arranged Perpendicular to one another or a detector array are utilized.

Figure 4:
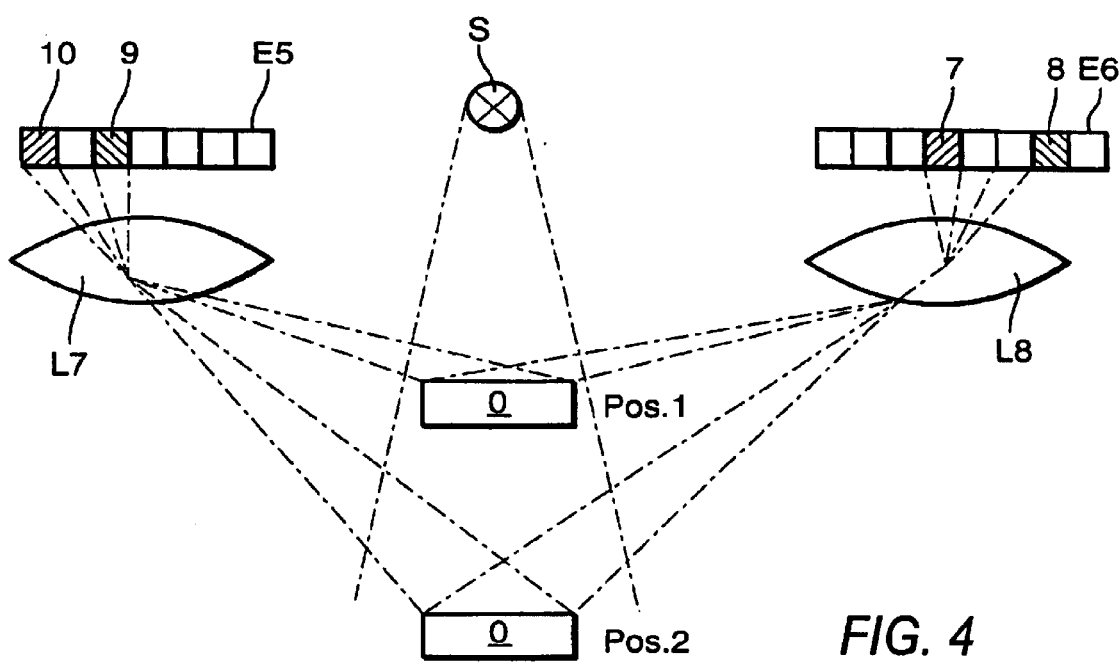
FIG. 4 is a view showing the use of two light receivers which are offset relative to one another, for spacial tracking of a measuring object.

FIG. 4 shows a further embodiment of the inventive scattered light smoke detector. The transmitter S3 defines a light cone in which an object O is located in a position 1 and then in a position 2. Two light receivers E5 and E6 are arranged symmetrically to the light transmitter S3 and each having a detector row. A first lens L7 is arranged before the light receiver E5 as an imaging optical system, and before the light receiver EG an image optical system L8 formed as a lens is arranged, The Position 1 leads at the light receiver E8 to radiation of a detector element 8 and the position 2 leads to radiation of the detector element 7. With the light receiver E5, the position 1 leads to radiation of the light element 9 and the position 2 leads to activation of a detector element 10. A not shown processor which are located after them makes possible a spacial tracking of the object O. Thereby with the light receivers E5 and E6, similarly to the human eye, the possibility for spacial vision is provided when the object O moves from the position 1 to the position 2 and therefore an image travels on the detector cells of the light receivers E5 and E6 to the left.

By correlation of the instantaneous signals of the detector cells with a processor, it is possible to make a conclusion about the distance of the object from the detectors E5 and E6. The correlation process provides for a good possibility to determine the displacement of the detector cells-signals in time and thereby the speed of objects.

It will be understood that each of the elements described above, or two or more together, may also find a useful application in other types of constructions differing from the types described above.

While the invention has been illustrated and described as embodied in scattered light smoke alarm, it is not intended to be limited to the details shown, since various modifications and structural changes may be made without departing in anyway from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A dispersion light smoke detector, comprising means for providing a definite measuring volume, said means being formed as means selected from the group consisting of two light receivers, and an imaging optical system for one light receiver, each of said light receivers having two detector cells which are arranged perpendicular to one another for a two-dimensional tracking of a measuring object.

2. A dispersion light smoke detector as defined in claim 1, wherein each of said light receivers is formed as a detector row.

3. A dispersion light smoke detector as defined in claim 1, wherein each of said light receivers is formed as a detector array.

4. A dispersion light smoke detector, comprising means for providing a definite measuring volume, said means being formed as means selected from the group consisting of two light receivers, and an imaging optical system for one light receiver, said two light receivers having each an element selected from the group consisting of a detector row and a detector array; and a processor which is connected with said at least one element and is operative for determining a parameter of a measuring object selected from the group consisting of a distance, a speed, and both, from signals of said two light receivers.

5. A dispersion light smoke detector as defined in claim 4, wherein said processor is formed so as to evaluate contours of the measuring object for distinguishing between smoke and another object.

6. A dispersion light smoke detector, comprising means for providing a definite measuring volume, wherein the definite measuring volume is outside of the dispersion light smoke detector, said means being formed as means consisting of two light receivers, and an imaging optical system for one light receiver.

\* \* \* \* \*